United States Patent
Novak

(10) Patent No.: US 7,899,231 B2
(45) Date of Patent: Mar. 1, 2011

(54) SYSTEM AND METHOD FOR SPLICING MEDICAL IMAGE DATASETS

(75) Inventor: Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1119 days.

(21) Appl. No.: 11/314,497

(22) Filed: Dec. 21, 2005

(65) Prior Publication Data

US 2006/0171578 A1    Aug. 3, 2006

Related U.S. Application Data

(60) Provisional application No. 60/647,915, filed on Jan. 28, 2005.

(51) Int. Cl.
  G06K 9/00    (2006.01)
  G06K 9/32    (2006.01)

(52) U.S. Cl. ............... 382/131; 382/154; 382/128; 382/170; 382/173; 382/129; 382/134; 382/190; 378/4; 378/62; 600/407; 600/410

(58) Field of Classification Search ........... 382/131, 382/154, 128, 170, 173, 224, 303, 300, 304, 382/129, 130, 134, 190, 132; 378/4, 62; 324/307, 309; 600/407, 410
See application file for complete search history.

(56) References Cited

U.S. PATENT DOCUMENTS

| | | | | |
|---|---|---|---|---|
| 6,151,521 A * | 11/2000 | Guo et al. | ............... | 600/407 |
| 6,466,687 B1 * | 10/2002 | Uppaluri et al. | ............ | 382/128 |
| 6,483,934 B2 * | 11/2002 | Armato et al. | ............ | 382/132 |
| 6,697,506 B1 * | 2/2004 | Qian et al. | ................ | 382/128 |
| 6,716,175 B2 * | 4/2004 | Geiser et al. | ............... | 600/450 |
| 6,724,925 B2 * | 4/2004 | Armato et al. | ............ | 382/132 |
| 6,728,334 B1 * | 4/2004 | Zhao | .......................... | 378/62 |
| 6,775,399 B1 * | 8/2004 | Jiang | .......................... | 382/128 |
| 6,983,063 B1 * | 1/2006 | Novak et al. | ............... | 382/131 |
| 7,043,064 B2 * | 5/2006 | Paik et al. | ................... | 382/128 |
| 7,280,710 B1 * | 10/2007 | Castro-Pareja et al. | ...... | 382/303 |
| 7,356,173 B2 * | 4/2008 | Wiemker et al. | ............ | 382/128 |
| 7,634,061 B1 * | 12/2009 | Tumer et al. | ............... | 378/98.9 |
| 7,634,119 B2 * | 12/2009 | Tsougarakis et al. | ........ | 382/128 |

(Continued)

OTHER PUBLICATIONS

An Algorithm of 3D Medical Image Cutting (Journal of Hangzhou Institute of Electronic Engineering, JianZhang, GouhuaWu, Zhigneg Pan, vol. 23, No. 6, pp. 50-52).

(Continued)

*Primary Examiner*—Wesley Tucker
*Assistant Examiner*—Nancy Bitar
(74) *Attorney, Agent, or Firm*—Donald B. Paschburg; F. Chau & Associates, LLC

(57) ABSTRACT

A system and method for splicing medical image datasets are provided. The method for splicing medical image datasets comprises: segmenting first and second medical image datasets comprising an organ of interest and a nearby area to create a mask for points in the first and second medical image datasets, wherein the mask identifies points in the organ of interest and nearby area; and creating a spliced image of the first and second medical image datasets by using the points in the organ of interest and nearby area identified by the mask.

13 Claims, 5 Drawing Sheets

U.S. PATENT DOCUMENTS

2002/0028008 A1* 3/2002 Fan et al. ................... 382/131
2004/0252870 A1* 12/2004 Reeves et al. ............... 382/128

OTHER PUBLICATIONS

Hu et al., "Automatic Lung Segmentation for Accurate Quantitation of Volumetric X-Ray CT Images", IEEE Transactions on Medical Imaging, vol. 20, No. 6, Jun. 2001, pp. 490-498.

Fiebich et al., "Automatic Bone Segmentation Technique for CT Angiographic Studies", Journal of Computer Assisted Tomography, vol. 23(1) Jan./Feb. 1999 pp. 155-161.

Shen et al., "Tracing Based Segmentation for the Labeling of Individual Rib Structures in Chest CT Volume Data", Proceedings of the 7th International Conference on Medical Image Computing and Computer Assisted Intervention, Rennes, Saint-Malo, France, Sep. 2004.

* cited by examiner

SYSTEM AND METHOD FOR SPLICING MEDICAL IMAGE DATASETS

CROSS-REFERENCE TO RELATED APPLICATION

This application claims the benefit of U.S. Provisional Application No. 60/647,915, filed Jan. 28, 2005, a copy of which is herein incorporated by reference.

BACKGROUND OF THE INVENTION

1. Technical Field

The present invention relates to medical image data storage and transmission, and more particularly, to a system and method for splicing medical image datasets.

2. Discussion of the Related Art

Medical imaging has had a great impact on the diagnosis of diseases and surgical planning. However, imaging devices such as computed tomography (CT) and magnetic resonance imaging (MRI) devices typically generate large amounts of data per patient. This occurs because multiple images of the same region of a patient's body are acquired by using different parameters designed to highlight or enhance different organs within the same area of the body.

For example, from a single CT session, a high-resolution CT acquisition of a patient's chest is often reconstructed with at least two different reconstruction kernels. Here, a first reconstruction may include a "hard" kernel that gives sharp edges and distinguishes between air and non-air structures such as vessels within the patient's lungs and a second reconstruction may include a "soft" kernel that shows less noise in soft tissues of the chest, but shows blurring artifacts in the lungs. The reconstructions are then stored, at least doubling the amount of storage space used by a conventional picture archiving communications system (PACS) data management station.

Although these reconstructions provide an examining physician with valuable information to aid them in their diagnosis of the patient, the space available to store the data associated with the reconstructions in a PACS data management station is limited. In addition, the time it takes to transmit such data increases. As a result, data compression schemes have been developed to reduce the amount of data generated by medical imaging devices.

Currently, such data compression schemes tend to produce high compression rates with a loss in image quality. However, examining physicians and their patients cannot afford deficiencies in diagnostically important regions. As such, a need exists for a technique of reducing the amount of data generated by medical imaging devices while preserving image quality.

SUMMARY OF THE INVENTION

The present invention overcomes the foregoing and other problems encountered in the known teachings by providing a system and method for splicing medical image datasets.

In one embodiment of the present invention, a method for splicing medical image datasets comprises: segmenting first and second medical image datasets comprising an organ of interest and a nearby area to create a mask for points in the first and second medical image datasets, wherein the mask identifies points in the organ of interest and nearby area; and creating a spliced image of the first and second medical image datasets by using the points in the organ of interest and nearby area identified by the mask.

The first and second medical image datasets are segmented by an automatic or semi-automatic segmentation technique. The first and second medical image datasets are acquired simultaneously or at different times.

The first and second medical image datasets are acquired by a CT or MRI technique. The first and second medical image datasets are created by using different reconstruction parameters or weightings.

When the first and second medical image datasets represent two-dimensional image data the points in the first and second medical image datasets are pixels and when the first and second medical image datasets represent three-dimensional image data the points in the first and second medical image datasets are voxels.

The organ of interest is a lung, brain or liver of a patient. The nearby area is a portion of a chest, abdomen or head of a patient that is not part of the organ of interest.

The spliced image comprises the points in the organ of interest identified by the mask from the first medical image dataset and the points in the nearby area identified by the mask from the second medical image dataset.

In another embodiment of the present invention, a system for splicing medical image datasets comprises: a memory device for storing a program; a processor in communication with the memory device, the processor operative with the program to: segment first and second medical image datasets comprising an organ of interest and a nearby area to create a mask for points in the first and second medical image datasets, wherein the mask identifies points in the organ of interest and nearby area; and create a spliced image of the first and second medical image datasets by using the points in the organ of interest and nearby area identified by the mask.

The first and second medical image datasets are segmented by an automatic or semi-automatic segmentation technique. The first and second medical image datasets are acquired simultaneously or at different times.

The first and second medical image datasets are acquired by a CT or MRI device. The first and second medical image datasets are created by using different reconstruction parameters or weightings.

When the first and second medical image datasets represent two-dimensional image data the points in the first and second medical image datasets are pixels and when the first and second medical image datasets represent three-dimensional image data the points in the first and second medical image datasets are voxels.

The organ of interest is a lung, brain or liver of a patient. The nearby area is a portion of a chest, abdomen or head of a patient that is not part of the organ of interest.

The spliced image comprises the points in the organ of interest identified by the mask from the first medical image dataset and points in the nearby area identified by the mask from the second medical image dataset.

In yet another embodiment of the present invention, a method for splicing medical image datasets comprises: segmenting first, second and third medical image datasets comprising a plurality of organs of interest and a nearby area to create a first mask and a second mask for points in the first, second and third medical image datasets, wherein the first mask assigns a first value to points in the first organ of interest and a second value to points in the nearby area, and the second mask assigns a third value to points in the second organ of interest and a fourth value to the points in the nearby area; and creating a spliced image of the first, second and third medical image datasets by using the first through fourth values assigned by the first and second masks.

The first, second and third medical image datasets are segmented by an automatic or semi-automatic segmentation technique. The first, second and third medical image datasets are acquired simultaneously or at different times.

The first, second and third medical image datasets are acquired by a CT or MRI technique, wherein the first and second image datasets are created by using different reconstruction parameters or weightings.

The spliced image comprises the points in the first organ of interest assigned the first value by the first mask from the first medical image dataset, the points in the second organ of interest assigned the third value by the second mask from the second medical image dataset, and the points in the nearby area assigned the second and fourth values by the first and second masks from the third medical image dataset.

Segmenting first, second and third medical image datasets further comprises creating a default mask, wherein the default mask assigns a fifth value to the points in the first and second organs of interest assigned the first and third values and a sixth value to the points in the nearby area assigned the second and fourth values.

In still another embodiment of the present invention, a system for splicing medical image datasets comprises: a memory device for storing a program; a processor in communication with the memory device, the processor operative with the program to: segment first, second and third medical image datasets comprising a plurality of organs of interest and a nearby area to create a first mask and a second mask for each point in the first, second and third medical image datasets, wherein the first mask assigns a first value to points in the first organ of interest and a second value to points in the nearby area, and the second mask assigns a third value to points in the second organ of interest and a fourth value to the points in the nearby area; and create a spliced image of the first, second and third medical image datasets by using the first through fourth values assigned by the first and second masks.

The first, second and third medical image datasets are segmented by an automatic or semi-automatic segmentation technique. The first, second and third medical image datasets are acquired simultaneously or at different times.

The first, second and third medical image datasets are acquired by a CT or MRI device, wherein the first and second medical image datasets are created by using different reconstruction parameters or weightings.

The spliced image comprises the points in the first organ of interest assigned the first value by the first mask from the first medical image dataset, the points in the second organ of interest assigned the third value by the second mask from the second medical image dataset, and the points in the nearby area assigned the second and fourth values by the first and second masks from the third medical image dataset.

The processor is further operative with the program when segmenting first, second and third medical image datasets to: create a default mask, wherein the default mask assigns a fifth value to the points in the first and second organs of interest assigned the first and third values and a sixth value to the points in the nearby area assigned the second and fourth values.

In another embodiment of the present invention, a method for combining medical image datasets into a single medical image dataset comprises: acquiring first and second medical image datasets of an organ of interest by using a computed tomography (CT) or magnetic resonance imaging (MRI) technique, wherein the first and second medical image datasets are created by using different reconstruction parameters or weightings; segmenting the first and second medical image datasets to create a mask for points in the first and second medical image datasets, wherein the mask identifies points in the organ of interest and points not in the organ of interest; and combining the first and second medical image datasets to create a single medical image dataset associated with the first and second medical image datasets by using the points identified by the mask.

The first and second medical image datasets are reconstructed by using a hard lung kernel, a soft tissue kernel, a bone kernel, a sharp kernel or a smooth kernel.

The first and second medical image datasets are reconstructed by using T1-weighted, T2-weighted, proton density weighted or intermediate weighted MR weightings.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
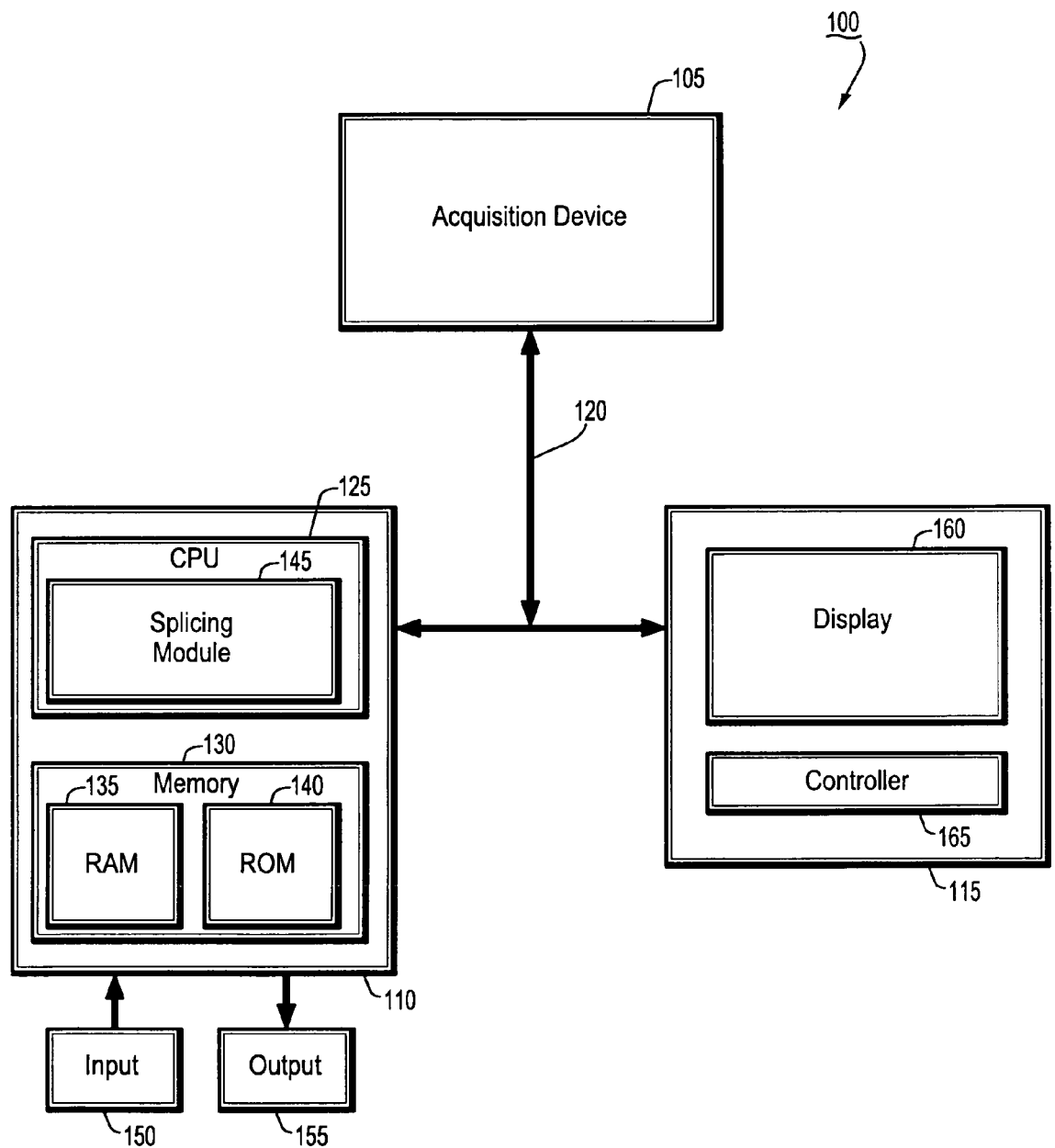
FIG. 1 is a block diagram of a system for splicing medical image datasets according to an exemplary embodiment of the present invention.

FIG. 1 is a block diagram of a system 100 for splicing medical image datasets according to an exemplary embodiment of the present invention.

As shown in FIG. 1, the system 100 includes, inter alia, an acquisition device 105, a PC 110 and an operator's console 115 connected over a wired or wireless network 120.

The acquisition device 105 may be a MRI device, a CT imaging device, a helical CT device, a positron emission tomography (PET) device, a 2D or 3D fluoroscopic imaging device, a 2D, 3D, or 4D ultrasound imaging device, or an x-ray device. The acquisition device 105 may also be a hybrid-imaging device capable of CT, MR, PET or other imaging techniques.

The PC 110, which may be a portable or laptop computer, a medical diagnostic imaging system or a PACS data management station, includes a CPU 125 and a memory 130, connected to an input device 150 and an output device 155. The CPU 125 also includes a splicing module 145 that includes one or more methods for splicing medical image datasets to be discussed hereinafter with reference to FIGS. 2-5.

The memory 130 includes a RAM 135 and a ROM 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by an LCD, CRT display, or printer.

The operation of the system 100 may be controlled from the operator's console 115, which includes a controller 165, for example, a keyboard, and a display 160. The operator's console 115 communicates with the PC 110 and the acquisition device 105 so that 2D image data collected by the acquisition device 105 can be rendered into 3D data by the PC 110 and viewed on the display 160. It is to be understood that the PC 110 can be configured to operate and display information provided by the acquisition device 105 absent the operator's console 115, using, for example, the input 150 and output 155 devices to execute certain tasks performed by the controller 165 and display 160.

The operator's console 115 may further include any suitable image rendering system/tool/application that can process digital image data of an acquired image dataset (or portion thereof) to generate and display 2D and/or 3D images on the display 160. More specifically, the image rendering system may be an application that provides 2D/3D rendering and visualization of medical image data, and which executes on a general purpose or specific computer workstation. Moreover, the image rendering system may enable a user to navigate through a 3D image or a plurality of 2D image slices. The PC 110 may also include an image rendering system/tool/application for processing digital image data of an acquired image dataset to generate and display 2D and/or 3D images.

The splicing module 145 may also be used by the PC 110 to receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from the PC 110 via the network 120 to an image rendering system in the operator's console 115 for generating 2D and/or 3D renderings of image data in accordance with the data processing results, such as segmentation of organs or anatomical structures, color or intensity variations, and so forth.

Figure 2:
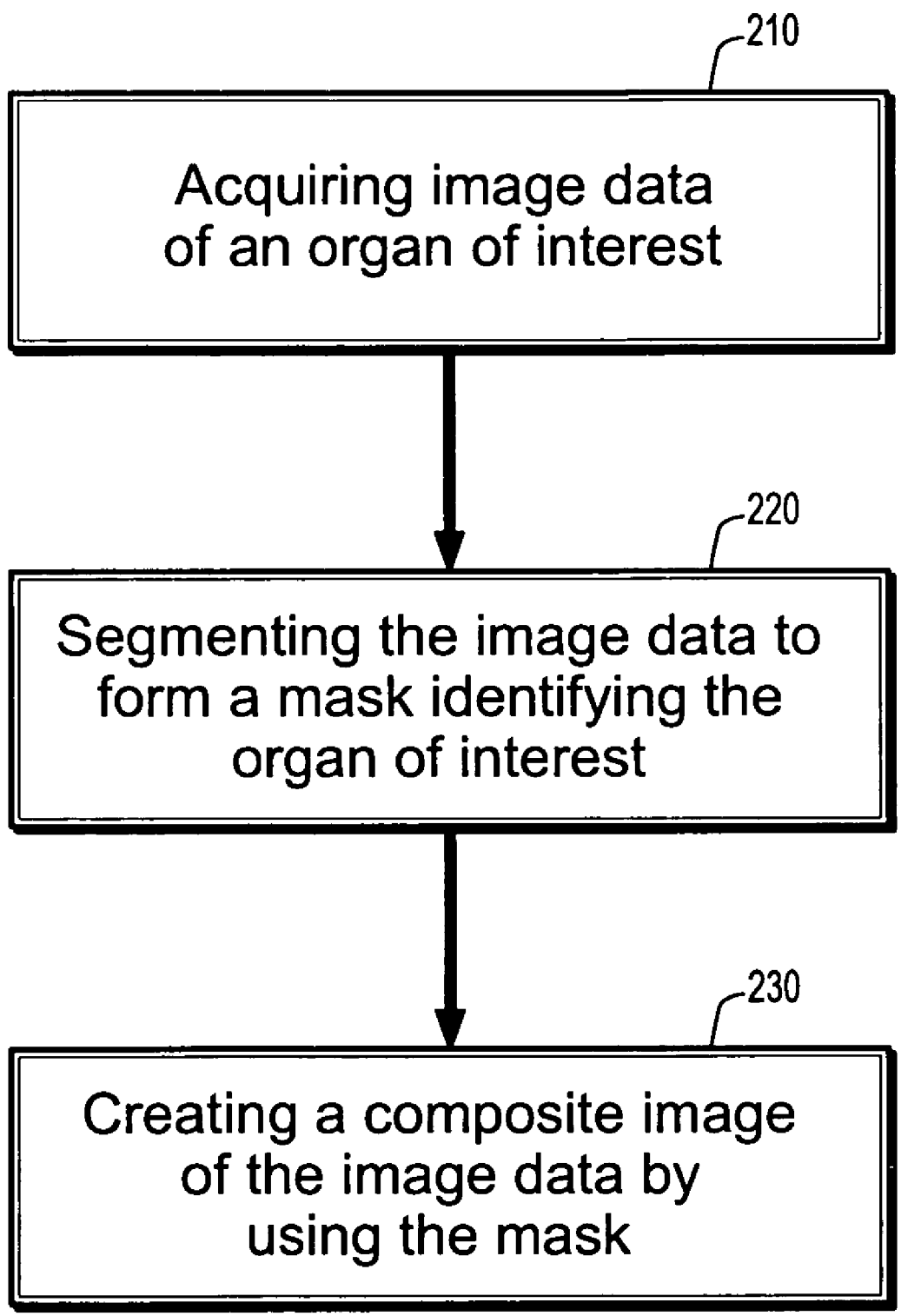
FIG. 2 is a flowchart illustrating a method for splicing medical image datasets according to an exemplary embodiment of the present invention.

FIG. 2 is a flowchart showing an operation of a method for splicing medical image datasets according to an exemplary embodiment of the present invention.

As shown in FIG. 2, image data is acquired from an organ or organs of interest such as a pair of lungs inside a patient (210). This is accomplished by using the acquisition device 105, in this example a CT scanner, which is operated at the operator's console 115, to scan the patient's chest or lungs thereby generating a series of 2D image slices associated with the lungs. The 2D image slices of the lungs are then combined to form a 3D image.

It is to be understood that in addition to the lungs, CT image data can be acquired from any one of a leg, arm, brain, abdomen or other body part containing single/multiple organs or single/multiple tissue types. Further, other types of data acquired from an MRI device or any imaging device associated with the various modalities of the acquisition device 105 may be used in accordance with an exemplary embodiment of the present invention.

In addition, the image data is understood to include at least two image datasets, which may be acquired at the same time or at different times. Further, as the image datasets are acquired they are reconstructed by using different reconstruction parameters or weightings. For example, the image data may include a first CT image dataset including a "lung kernel" reconstruction volume, a second CT image dataset including a "soft tissue" reconstruction volume or a third CT image dataset including a "bone kernel" reconstruction volume. In addition, the image data may include a first or second MR image dataset reconstructed by using T1-weighted, T2-weighted, proton density weighted or intermediate weighted MR weightings.

After the CT image data is acquired and reconstructed, the image data is segmented (220). The image data may be segmented by using an automatic segmentation technique. For example, an automatic segmentation technique, disclosed in Hu S., Hoffman E. A., Reinhardt J. M., "Automatic Lung Segmentation for Accurate Quantitation of Volumetric X-ray CT Images", IEEE Trans. Med. Imaging 20(6): 490-8, 2001, a copy of which is incorporated by reference herein in its entirety, may be used in this step.

In this technique, for example, the lung region is first extracted from CT images by gray-level thresholding. Then, the left and right lungs are separated by identifying the anterior and posterior junctions by dynamic programming. Finally, a sequence of morphological operations is used to smooth the irregular boundary along the mediastinum to obtain results consistent with those obtained by manual analysis in which only the most central pulmonary arteries are excluded from the lung region.

Another automatic segmentation technique, disclosed in U.S. patent application No. 2002/0028008, entitled "Automatic Detection of Lung Nodules from High Resolution CT Images", a copy of which is incorporated by reference herein in its entirety, may be used in this step. In this technique, for example, areas of images containing the lungs are detected by thresholding and connected components labeling. The precise delineation between the lungs and the chest wall may be further refined by post-processing means such as a "rolling ball algorithm".

In addition to the automatic segmentation techniques just described, a semi-automatic segmentation technique for segmenting structures such as ribs, disclosed in Fiebich M., Straus C. M., Sehgal V., Renger B. C., Doi K., Hoffmann K. R., "Automatic Bone Segmentation Technique for CT Angiographic Studies", J. Computer Assisted Tomography, 23(1): 155-61, 1999, a copy of which is incorporated by reference herein in its entirety, may be used in this step.

Yet another automatic segmentation technique, disclosed in Shen H, Liang L., Shao M., Qing S, "Tracing Based Segmentation for the Labeling of Individual Rib Structures in Chest CT Volume Data", Proceedings of the $7^{th}$ International Conference on Medical Image Computing and Computer Assisted Intervention, Rennes, Saint-Malo, France, September 2004, a copy of which is incorporated by reference herein in its entirety, may also be used in this step.

Once the segmentation of the image data has been completed, a mask specifying each point in the image dataset of the image data is created. In other words, a mask that identifies which pixels or voxels of the acquired image datasets are part of the organ or organs of interest is generated by the segmentation. In more detail, once an organ of interest has been segmented, a mask m is provided such that:

$m[i,j]=1$ for pixels within the organ $m[i,j]=0$ for all other pixels [1]

where i and j specify indices in the image. Although equation [1] is defined for 2D images, the same principle applies for 3D and higher dimensional image data.

Given the mask, a new composite or spliced image is created by using the pixels from the image datasets (230). This is accomplished by first assuming (in this example) that there are two datasets for a body part of interest, which may contain two or more organs of interest. In other words, the image data of the body part includes a first CT image dataset and a second CT image dataset. The datasets are defined as, $D_1[i,j]$ and $D_2[i,j]$, where $D_1$ is a dataset intended for viewing the organ of interest and $D_2[i,j]$ is a dataset intended for viewing a different organ that falls within the same region of the body. For example, $D_1$ may be intended for viewing the lungs, whereas $D_2$ may be intended for viewing the soft tissues of the chest. In this case, the spliced image S will be given as:

$$S[i,j]=D_1[i,j]*m[i,j]+D_2[i,j]*(1-m[i,j]) \quad [2]$$

As shown by equation [2], since m takes on only values of 0 or 1, either the first half of the equation will have a value of zero, in which case the pixels from the second dataset are spliced into the image S, or the second half of the equation will have a value of zero, in which case the pixels from the first dataset will be spliced into the image S.

If multiple organs of interest have been extracted, a mask for each organ may be provided. For example, if multiple organs have been extracted from a CT scan of a patient's chest, there will be a mask specifying the location of the lungs and a mask specifying a location of the ribs. In this case, each mask $m_o$ may be provided such that:

$m_o[i,j]=1$ for pixels within the organ o $m_o[i,j]=0$ for all other pixels $\quad [3]$ In addition, there may be a default mask $m_n$, which, for example, is intended to view all structures outside the extracted organ or organs, and is defined as:

$m_n[i,j]=1$ for all pixels with value 1 in another mask $m_{n[i,j]}=1$ for all other pixels $\quad [4]$ Although equations [3] and [4] are defined for 2D images, the same principle applies for 3D and higher dimensional image data.

Assuming the masks do not overlap, such that:

$$\sum_{o=1}^{n} m_o[i,j] = 1 \quad [5]$$

the output spliced image S is given by:

$$S = \sum_{o=1}^{n} D_o[i,j] * m_o[i,j] \quad [6]$$

where $D_o$ is, for example, the dataset acquired or reconstructed to examine an organ o.

An application of the system and method according to an exemplary embodiment of the present invention will now be described with reference to FIGS. 3-5.

Figure 3A:
FIG. 3 is a pair of images illustrating a slice from a CT volume where a "hard" kernel was used during data reconstruction.
Figure 3B:
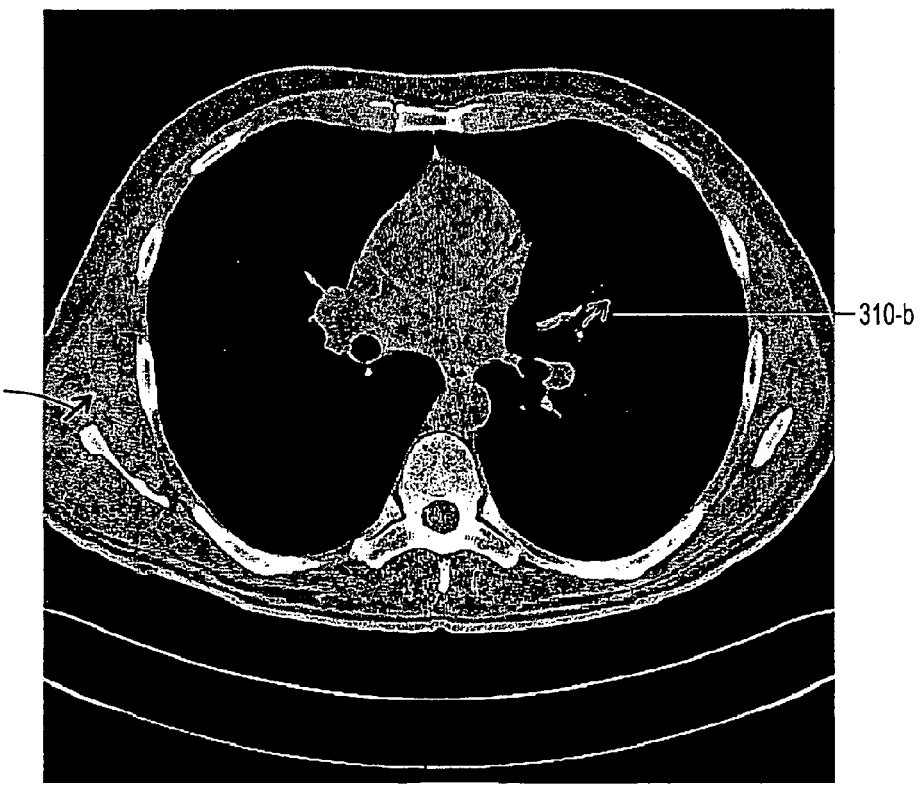

Referring to images (a) and (b) of FIG. 3, a slice from a chest CT volume where a hard kernel had been used during data reconstruction to give a sharp definition of vessels and airways within the lungs is illustrated. In more detail, image (a) shows the lung reconstruction rendered with a "lung" window to optimize the display of lung tissues and image (b) shows the same lung reconstruction rendered with "mediastinal" windowing to better visualize soft tissues outside the lungs.

In images (a) and (b), arrows or points 310a and b identify vessels within the lungs and arrows or points 320a and b identify an area within soft tissues of the chest. As can be observed, although there is a good definition around the arrow 310a, noise and artifacts are present in the region identified by the arrow 320b. This is so because the reconstruction kernel used here is optimal for viewing the lungs but not very good for viewing soft tissues within the chest.

Figure 4A:
FIG. 4 is a pair of images illustrating a slice from a CT volume where a "soft" kernel was used during data reconstruction.
Figure 4B:
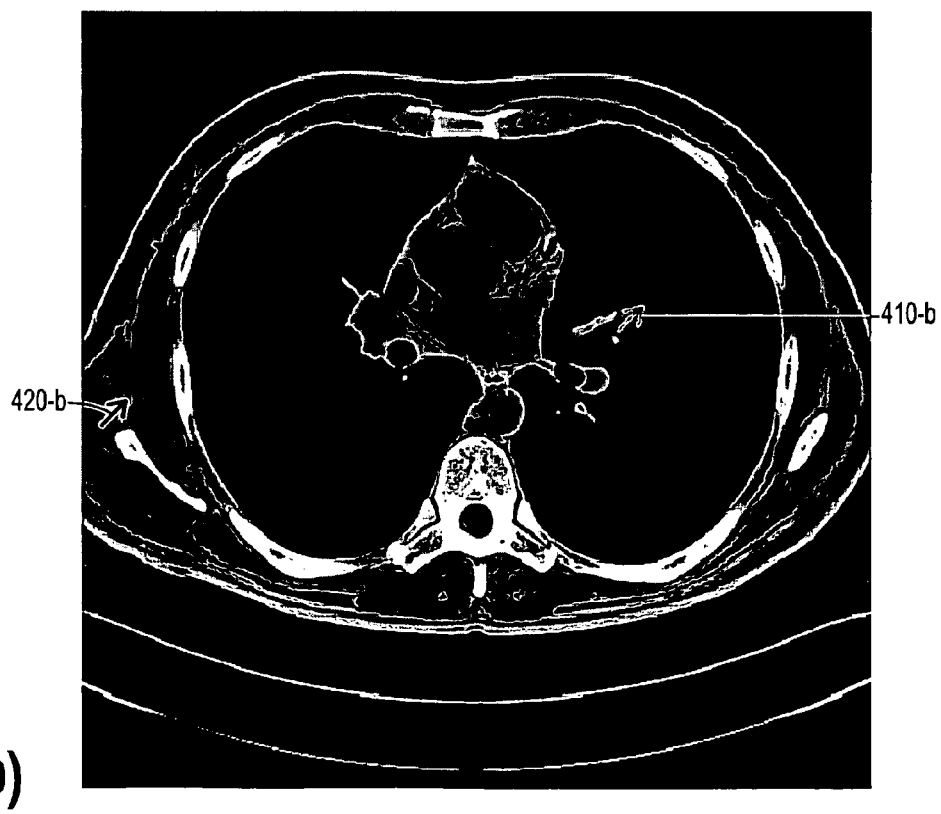

Referring now to images (a) and (b) of FIG. 4, another image slice from the same position is illustrated; however, here a soft kernel has been used to reconstruct the data. As in FIG. 3, image (a) of FIG. 4 shows a rendering of the lung window and image (b) of FIG. 4 shows a rendering of the mediastinal window. In this pair of images, arrows or points 410a and b identify vessels within the lungs and arrows or points 420a and b identify an area within soft tissues of the chest.

As can be observed, the lung vessels show noticeable blurring near the arrow 410a, whereas the soft tissues near the arrow 420b do not show the noise artifacts illustrated, for example, in image (b) of FIG. 3. This is so because the soft reconstruction kernel is optimal for viewing soft tissues within the chest but not very good for viewing areas within the lungs.

Figure 5A:
FIG. 5 is a pair of images illustrating the images of FIGS. 3 and 4 spliced according to an exemplary embodiment of the present invention.
Figure 5B:
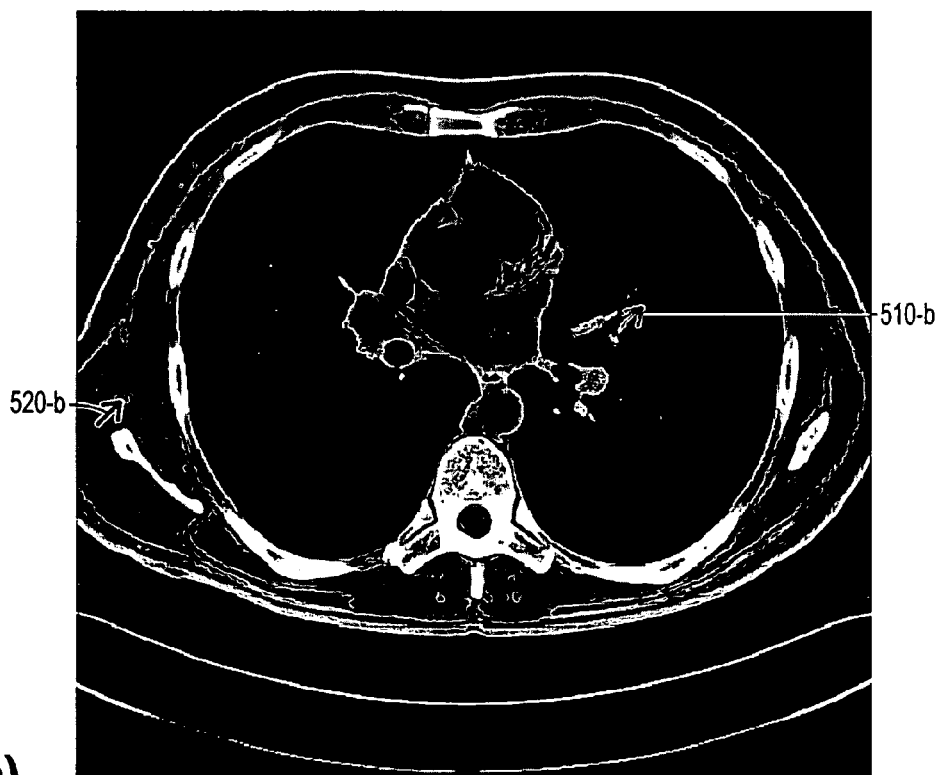

FIG. 5 illustrates the two reconstructions of FIGS. 3 and 4 spliced in accordance with an exemplary embodiment of the present invention. In particular, image (a) shows a spliced image with lung windowing and image (b) shows a spliced image with mediastinal windowing. In this pair of images, arrows or points 510a and b identify vessels within the lungs and arrows or points 520a and b identify an area within soft tissues of the chest. As can be observed, the arrow 510a shows good definition of the lung vessels and the arrow 520b shows good definition of the soft tissues. In other words, the spliced images include the optimal parts of both reconstruction kernels in a single dataset.

In more detail, FIG. 5 illustrates the regions of the CT volume that contain the lungs identified by the hard kernel reconstruction volume (in images (a) and (b) of FIG. 3) spliced into the soft kernel reconstruction volume (in images (a) and (b) of FIG. 4). The resulting single volume illustrated in images (a) and (b), contains all the relevant information (e.g., fine detail of the lungs and soft tissues of the chest) from the original two reconstructions in FIGS. 3 and 4, but would only occupy half as much storage space and take half as much time to be transmitted across, for example, a hospital network, than that of the original datasets from FIGS. 3 and 4.

Thus, according to an exemplary embodiment of the present invention, two or more medical image datasets, which may be acquired or reconstructed simultaneously or nearly simultaneously, are spliced to form a single image or a single volume for volumetric data that can be stored or transmitted for subsequent review by physicians. For example, the single image may include a hard kernel reconstruction and a soft tissue reconstruction, thus enabling a physician to examine both the lungs and the soft tissues with their optimal kernels. Since, the amount of space used to store the single image and the amount of time to transmit data associated therewith across a network is less than that of the two or more medical image datasets, costs for data storage and transmission may be reduced.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations. That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention.

It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for splicing medical image datasets, comprising:
    acquiring a first medical image dataset with a first acquisition process to produce an image of a lung that has sharply defined blood vessels and noisy soft tissue;
    segmenting the first medical image dataset to create a first mask that distinguishes between points of the sharply defined blood vessels and the noisy soft tissue;
    acquiring a second medical image dataset with a second acquisition process to produce another image of the lung where the blood vessels are noisy and the soft tissue is sharply defined;
    segmenting the second medical image dataset to create a second mask that distinguishes between points of the noisy blood vessels and the sharply defined soft tissue; and
    creating a spliced image of the first and second medical image datasets by removing the noisy blood vessels from the second mask and inserting the sharply defined blood vessels from the first mask into the second mask, wherein the spliced image only includes the modified second mask,
    wherein the method is performed using a processor.

2. The method of claim 1, wherein the first and second medical image datasets are segmented by an automatic or semi-automatic segmentation technique.

3. The method of claim 1, wherein the first and second medical image datasets are acquired simultaneously or at different times.

4. The method of claim 1, wherein the first and second medical image datasets are acquired by a computed tomography (CT) or magnetic resonance imaging (MRI) technique.

5. The method of claim 1, wherein the first and second acquisition processes comprise different reconstruction parameters or weightings.

6. The method of claim 1, wherein when the first and second medical image datasets comprise two-dimensional image data the points of the sharply defined and noisy blood vessels and noisy and sharply defined soft tissue are pixels and when the first and second medical image datasets comprise three-dimensional image data the points of the sharply defined and noisy blood vessels and noisy and sharply defined soft tissue are voxels.

7. A system for splicing medical image datasets, comprising:
    a memory device for storing a program;
    a processor in communication with the memory device, the processor operative with the program to:
    acquire a first medical image dataset with a first acquisition process to produce an image of a lung that has sharply defined blood vessels and noisy soft tissue;
    segment the first medical image dataset to create a first mask that distinguishes between points of the sharply defined blood vessels and the noisy soft tissue;
    acquire a second medical image dataset with a second acquisition process to produce another image of the lung where the blood vessels are noisy and the soft tissue is sharply defined;
    segment the second medical image dataset to create a second mask that distinguishes between points of the noisy blood vessels and the sharply defined soft tissue; and
    create a spliced image of the first and second medical image datasets by removing the noisy blood vessels from the second mask and inserting the sharply defined blood vessels from the first mask into the second mask, wherein the spliced image only includes the modified second mask.

8. The system of claim 7, wherein the first and second medical image datasets are segmented by an automatic or semi-automatic segmentation technique.

9. The system of claim 7, wherein the first and second medical image datasets are acquired simultaneously or at different times.

10. The system of claim 7, wherein the first and second medical image datasets are acquired by a computed tomography (CT) or magnetic resonance imaging (MRI) device.

11. The system of claim 7, wherein the first and second acquisition processes comprise different reconstruction parameters or weightings.

12. The system of claim 7, wherein when the first and second medical image datasets comprise two-dimensional image data the points of the sharply defined and noisy blood vessels and noisy and sharply defined soft tissue are pixels and when the first and second medical image datasets comprise three-dimensional image data the points of the sharply defined and noisy blood vessels and noisy and sharply defined soft tissue.

13. A method for splicing medical image datasets, comprising:
    acquiring a first medical image dataset with a first acquisition process to produce an image that includes a sharply defined organ and noisy areas near the organ;
    segmenting the first medical image dataset to create a first mask that distinguishes between points of the sharply defined organ and the noisy areas near the organ;

acquiring a second medical image dataset with a second acquisition process to produce an image where the organ is noisy and the areas near the organ are sharply defined;

segmenting the second medical image dataset to create a second mask that distinguishes between points of the noisy organ and the sharply defined areas near the organ; and creating a spliced image of the first and second medical image datasets by removing the noisy organ from the second mask and inserting the sharply defined organ from the first mask into the second mask, wherein the spliced image only includes the modified second mask, wherein the method is performed using a processor.

* * * * *